United States Patent
Meyer et al.

(10) Patent No.: US 11,057,838 B2
(45) Date of Patent: Jul. 6, 2021

(54) ADAPTING OUTPUT POWER OF A RADIO TRANSMITTING ENTITY

(75) Inventors: Michael Meyer, Aachen (DE); Joachim Sachs, Sollentuna (SE); Anders Furuskär, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 677 days.

(21) Appl. No.: 14/370,182

(22) PCT Filed: Dec. 9, 2011

(86) PCT No.: PCT/EP2011/072283
§ 371 (c)(1),
(2), (4) Date: Jul. 1, 2014

(87) PCT Pub. No.: WO2013/083198
PCT Pub. Date: Jun. 13, 2013

(65) Prior Publication Data
US 2015/0003318 A1   Jan. 1, 2015

(51) Int. Cl.
*H04W 52/18* (2009.01)
*H04B 7/155* (2006.01)
*H04W 52/28* (2009.01)
*H04B 7/14* (2006.01)

(52) U.S. Cl.
CPC ............ *H04W 52/18* (2013.01); *H04B 7/14* (2013.01); *H04B 7/15535* (2013.01); *H04W 52/28* (2013.01)

(58) Field of Classification Search
None
See application file for complete search history.

(56) References Cited

U.S. PATENT DOCUMENTS

| | | | | |
|---|---|---|---|---|
| 5,804,817 A * | 9/1998 | Seiler | .................... | B60S 1/0822 250/227.25 |
| 5,926,117 A * | 7/1999 | Gunji | ...................... | G01S 19/04 340/988 |
| 6,727,816 B1 | 4/2004 | Helgeson | | |
| 7,974,755 B2 | 7/2011 | Campbell et al. | | |
| 9,078,090 B1 * | 7/2015 | Shahmoon | .............. | H04W 4/02 |
| 2003/0071590 A1 * | 4/2003 | Roman | .................... | E05F 15/70 318/282 |

(Continued)

FOREIGN PATENT DOCUMENTS

| CN | 1728595 A | 2/2006 |
|---|---|---|
| CN | 102237902 A | 11/2011 |

(Continued)

OTHER PUBLICATIONS

Directed Electronics. VIPER: Responder LC Model 5901 Security and Remote Start Owner's Guide. 2008.*

(Continued)

*Primary Examiner* — Andre Tacdiran
(74) *Attorney, Agent, or Firm* — Sage Patent Group

(57) ABSTRACT

A method of adapting the output power of a radio transmitting entity within a cage having at least one aperture. The method includes the steps of providing at least one sensor operable to sense the condition of the at least one aperture and providing a controller to adjust the output power of the radio transmitting entity in accordance with the sensed condition of the at least one aperture.

17 Claims, 1 Drawing Sheet

(56) References Cited

U.S. PATENT DOCUMENTS

| | | | |
|---|---|---|---|
| 2005/0002422 A1* | 1/2005 | Morihiro | H04W 28/22 370/477 |
| 2005/0124354 A1* | 6/2005 | Durgin | H04W 64/00 455/456.1 |
| 2005/0164728 A1* | 7/2005 | Matsubara | B60R 25/2009 455/521 |
| 2006/0200560 A1* | 9/2006 | Waugh | G06Q 10/08 709/224 |
| 2009/0128329 A1* | 5/2009 | Sato | B60R 25/245 340/568.1 |
| 2009/0191922 A1* | 7/2009 | Rokusek | H04M 1/6075 455/569.2 |
| 2009/0303035 A1* | 12/2009 | Kirtley, Jr. | B66F 9/0755 340/539.11 |
| 2010/0007742 A1* | 1/2010 | Satoh | H04B 15/04 348/193 |
| 2010/0136997 A1* | 6/2010 | Palanki | H04W 88/04 455/452.1 |
| 2010/0225482 A1* | 9/2010 | Kasai | G06K 19/0717 340/572.1 |
| 2011/0193721 A1* | 8/2011 | Koie | B60R 25/00 340/901 |
| 2011/0212744 A1* | 9/2011 | Katayama | H04W 52/143 455/522 |
| 2011/0237255 A1 | 9/2011 | Furukawa | |
| 2011/0269496 A1* | 11/2011 | Shinohara | H04W 52/283 455/522 |
| 2012/0077538 A1* | 3/2012 | Yun | H04B 1/3838 455/522 |
| 2012/0139206 A1* | 6/2012 | May | B60R 3/02 280/166 |
| 2012/0225681 A1* | 9/2012 | Hung | H04W 84/005 455/507 |
| 2014/0097671 A1* | 4/2014 | Nakamura | B60L 3/04 307/9.1 |

FOREIGN PATENT DOCUMENTS

| | | |
|---|---|---|
| KR | 10-2001-0113937 | 12/2001 |
| WO | WO 00/70784 A1 | 11/2000 |
| WO | WO 2000/070784 | 11/2000 |
| WO | WO 2005/053189 A1 | 6/2005 |

OTHER PUBLICATIONS

International Search Report, PCT Application No. PCT/EP2011/072283, dated Sep. 17, 2012.
Written Opinion of the International Searching Authority, PCT Application No. PCT/EP2011/072283, dated Sep. 17, 2012.
International Preliminary Report on Patentability, PCT Application No. PCT/EP2011/072283, dated Jun. 10, 2014.
"Power Window." Wikipedia: The Free Encyclopedia. Wikimedia Foundation, Inc., Apr. 26, 2016. Web. May 24, 2016. <https://en.wikipedia.org/wiki/Power_window>.
Brochure. Power Windows, Model E70, Production: From Start of Production, http://www.bmwmotorsports.org/pdf/e70/05a2_E70%20Power%20Windows.pdf, Initial print date: Oct. 2006.
Chinese Office Action dated Mar. 22, 2017 in corresponding Chinse Application No. 201180076299.3 The Second Office Action Form pp. 2; Translation Summary of Office Action pp. 2; Statements in Response to Second Office Action pp. 4.
Notice of Preliminary Rejection dated Dec. 8, 2017 in corresponding Korean Patent Application No. 10-2014-7016803, 4 pages.
Notice of Patent Allowance dated Jun. 12, 2018 in corresponding Korean Patent Application No. 2014-7016803, 5 pages.

* cited by examiner

ADAPTING OUTPUT POWER OF A RADIO TRANSMITTING ENTITY

CROSS REFERENCE TO RELATED APPLICATION

This application is a 35 U.S.C. § 371 national stage application of PCT International Application No. PCT/EP2011/072283, filed on 9 Dec. 2011, the disclosure and content of which is incorporated by reference herein in its entirety. The above-referenced PCT International Application was published in the English language as International Publication No. WO 2013/083198 A1 on 13 Jun. 2013.

TECHNICAL FIELD

The present invention relates to a method of adapting the output power of a radio transmitting entity within a cage having at least one configurable aperture and to a corresponding device.

BACKGROUND

The mobile broadband business is growing rapidly. Devices become cheaper, data rates higher and new services and applications can be supported. Users want to access a mobile network from home and also while on the move. A particular scenario for mobile access are vehicles, like cars, trucks, but also trains, aircrafts and the like. Because these vehicles move often very fast and have typically metallic surfaces the communication in such environment bears additional challenges. Also the walls of buildings often contain structural steel work. Hence cabins in vehicles and rooms in buildings (both herewith named as cages) often affect as a Faraday cage on radio transmission or signal. If mobile devices like mobile broadband devices are operated in cabins of vehicles or rooms in buildings they often suffer from a poor connection quality to a mobile network. In mobile networks, e.g., according to the 3GPP (3rd Generation Partnership Project), it is known to use relaying for improving capacity and/or coverage of the network. For example, in 3GPP LTE (Long Term Evolution) relaying was introduced in the Release 10 Technical Specifications (TSs). The general idea of relaying is that a relay node (RN) receives a transmission from a sender and forwards this transmission to a receiver. For example, a transmission can be received from a base station, in 3GPP LTE referred to as "evolved Node B" (eNB), and be forwarded to a mobile terminal or other type of user equipment (UE), or vice versa.

One can distinguish between decode and forward relays as in the case of the LTE Release 10 and an amplify and forward repeater. In the first case, the relay node receives the signal, it tries to reconstruct the data and sends the data in the same or a potentially different format to the ultimate receiver. In the case of LTE Release 10 this also implies that the relay node maintains its own cell with its corresponding reference and control signaling. The end user terminal does not notice that the node it is communicating with is a relay node and not a base station. This implies also that hand over procedures need to be performed when moving between relay nodes or between a relay node and a base station.

In case of an amplify and forward repeater, the repeater receives the signal and amplifies it without any link layer interactions. Thus in this case no own cell is created, only the original cell is extended by amplifying the signal. The presence of the repeater is transparent for the end user terminal.

There exist many different definitions for relays and repeater. For example repeaters are sometimes referred to as layer 1 relays or RF relays. Also the terms L2 relay or L3 relay are sometimes mentioned. The differences between them are related to the protocol layer where the transmission on the first link is terminated and the signal or data is transferred to the protocol stack of the second link.

Both repeaters and relays can be operated in both directions, uplink and downlink, i.e. from a base station via this intermediate node to an end user terminal and vice versa. Also in case of multihop operation, there could be several relay nodes involved in the communication path and in this case even relay nodes would communicate with relay nodes. Another special flavor of a relay node could be also a cooperative relay node.

To improve the connection quality in a cage it is known to install a repeater or RN inside the cage so that a pick-up antenna is able to feed the received radio signal into the repeater or RN and a second antenna inside the cage is used to convey the radio signal further to the mobile device or UE in the cage.

If a repeater or RN is operated in a cage it can be dimensioned in a way that these devices have enough output power to serve the limited space within the cage. Typically only a small output power is needed. Due to the metallic surface of the cabins and the structural steel work in walls of buildings, the interference caused to the outside radio signals is also limited and does typically not cause problems.

However, a lot of cabins in vehicles, like cars and also a lot of rooms have windows and other openings or apertures which can be configured between a closed position into an open-position and vice versa. Today a lot of windows comprise a metallic surface to protect against heat due to sun shine. If a window with a metallic surface opens, the attenuation of the cage will be reduced which can cause significant interference between the repeated radio signal inside the cage and the radio signals outside the cage.

In LTE a RN creates an own cell. If an LTE relay is operated in a vehicle (e.g. a car or truck) it can provide access to other LTE devices in the vehicle. A car having a LTE RN installed which is driving down a street with an open window could trigger all devices of pedestrians to connect to the installed RN in the car. This would cause a lot of signalling traffic for the mobile network since such a connection would typically hold only for a very short time. As soon as the car has moved a few meters the pedestrian's devices have to make another hand-over to a base station that typically serves the area.

In case of a repeater that is operated in a vehicle, a closed window implies an additional attenuation between an out side pick/up antenna and an inside sending antenna. If the window is opened, the additional decoupling between pick up and sending antenna is reduced. This may cause excessive feedback interference from the output to the input, which corrupts the signal quality.

SUMMARY

It is an object of the present invention to improve the relaying or repetition of radio signals of a mobile communication network in a cage. This object is achieved by the independent claims. Advantageous embodiments are described in the dependent claims.

The invention relates to a method of adapting the output power of a radio transmitting entity within a cage having at least one aperture. The method comprises the step of providing at least one sensor operable to sense the condition of the at least one aperture. Further the method comprises the step of providing a controller operable to adjust the output power of the radio transmitting entity in accordance with the sensed condition of the at least one aperture. The aperture can e.g. be a moveable window, a moveable roof of an open-topped car or a door in a building. The cage can be a cabin of a vehicle or a room in a building. The radio transmitting entity can be a relay node or a repeater. The condition of the at least one aperture can e.g. be the amount or character of attenuation of radio signals or transmission based on different metallic surfaces. It is also possible that the condition of the at least one aperture is an open-position of the at least one aperture.

In a further embodiment the output power is reduced if the at least one aperture opens and the output power is increased if the at least one aperture closes. This will reduce the possibility that an external mobile terminal will be connected with the radio transmitting entity.

In another embodiment the controller adjusts the output power of the radio transmitting entity as a linear function or a non-linear function of the condition of the aperture.

In another embodiment the controller adjust the output power of the radio transmitting entity in accordance with a mapping table which maps conditions of the aperture to a value of the output power.

The invention relates also to a radio transmitting entity, comprising an antenna, adapted to transmit a radio signal, a data receiving entity, adapted to receive condition information of at least one aperture from at least one sensor and a controller, adapted to adjust the output power for the antenna in accordance with the received condition information. The radio transmitting entity can be adapted to perform all the steps of the before mentioned methods. The controller can be e.g. an amplifier or any other kind of RF entity.

The invention further relates to a vehicle with at least one aperture, comprising a pick-up antenna for receiving a radio signal, at least one sensor which is adapted to monitor the condition of the at least one aperture, and a radio transmitting entity. The vehicle can be adapted to perform all the steps of the before mentioned methods.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
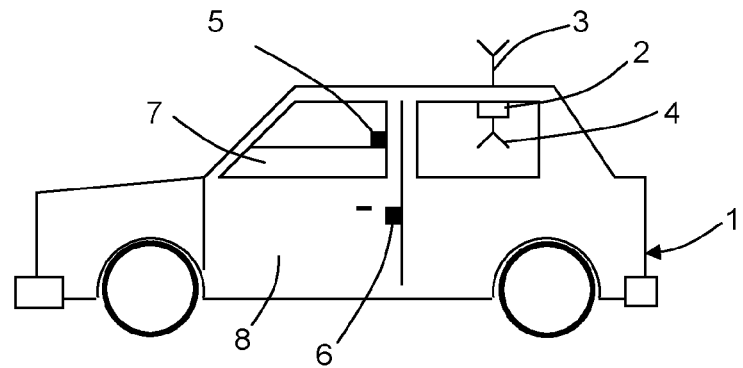
FIG. 1 shows a schematic diagram of an embodiment of the invention.

FIG. 1 shows a schematic diagram of a car 1 comprising a moveable window 7 and a moveable door as apertures according to the invention. The car 1 further comprises a repeater or a transceiver 2 which is adapted to receive a radio signal via a pick-up antenna 3. The transceiver can e.g. be a LTE relay node which serves its own cell. It is also possible that the transceiver is a wireless LAN repeater or any other kind of radio signal transceiver. The radio signal can be a radio transmission from a base station or an eNodeB of a mobile communication network located outside the car 1 which serves an area or cell in which the car 1 is currently located. The transceiver 2 is further connected to a serving antenna 4 which is adapted to send signals to mobile devices inside the cabin of the car 1. The cabin mostly comprises a metallic surface so that the cabin is a Faraday cage on radio transmission because the cage of the car 1 causes significant attenuation to the radio transmission of the external base station or eNodeB towards the inner location of the cage.

The car 1 further comprises sensors 5, 6 which are adapted to detect the opening status as a condition of moveable parts of the car 1. In this embodiment sensor 5 is adapted to detect the opening status of the moveable window 7 wherein the other sensor 6 is able to detect the opening status of a door 8. It is possible that more sensors are located inside the car to sense the status of further moveable apertures like a moveable roof of an open-topped car. The sensors can also detect the amount of attenuation caused by the moveable window 7 in case that the attenuation characteristics will change.

The sensors 5, 6 are connected to the transceiver 2 to provide status data or information to the transceiver 2. The connection between the sensors and the transceiver can be performed as a wireless link, a wired link or a mixture of both. If e.g. a moveable window 7 has been opened fully, the sensor 5 sends back the information that the moveable window 7 has been opened or has an open-position of 100%. If the window 7 has been half-opened, as depicted in FIG. 1, the sensor 5 sends information to the transceiver 2 which indicates an open-position of 50%. It is possible that many more open-positions or opening-status of a moveable window 7 can be reported in a more fine grained way by the sensor 5 to the transceiver 2. It is further possible that each moveable window or any other aperture in a car 1 is monitored by a sensor 5, 6. The same situation can apply for each door 8 of the car 1. It is also possible that the sensors 5, 6 only detects in a binary way whether a moveable window 7 or door 8 is opened or closed.

In another non depicted embodiment a room in a building comprises a transceiver 2, a pick-up antenna 3 and at least one serving antenna 4. Windows, doors or other apertures of the room in the building can be monitored by sensors 5, 6 in the same way as it is explained under FIG. 1.

Figure 2:
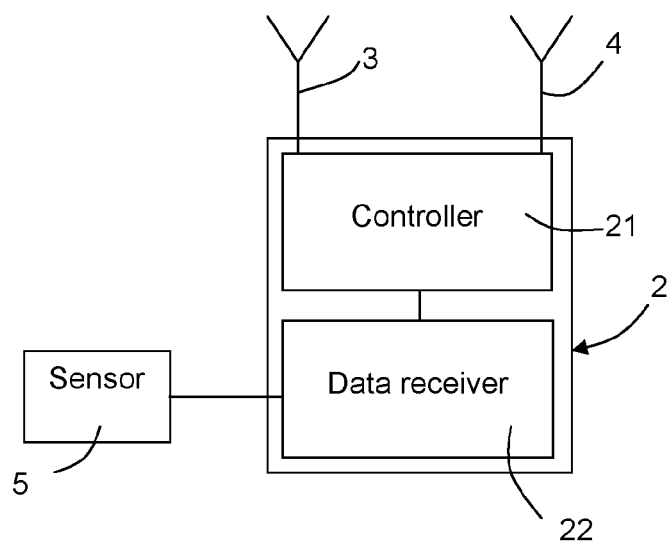
FIG. 2 shows a further schematic diagram of an embodiment of the invention.

FIG. 2 depicts an embodiment of a transceiver 2, comprising a controller 21 and a data receiver 22 which is connected to the controller 21. The data receiver 22 is connected or linked to at least one sensor 5 so that the at least one sensor 5 is able to provide open-position or condition data via the data receiver 22 to the controller 21. The controller 21 is adapted to adjust the output power of a radio signal over the serving antenna 4 which has been received via a pick-up antenna 3 in accordance with the received sensor data. It is possible that the minimum output power is "0" which means that no transmission will be done via the serving antenna 4 if all apertures in the vehicle or room are completely open or the attenuation to radio transmission is very low. So if there is only low attenuation the user device can typically be connected directly to an external serving base station without using a relay node. The minimum and maximum output power can also be certain output power values which can be defined in accordance with the strength of the outer field or in accordance with the attenuation value of the cage.

In one embodiment of the invention the relationship between the open-position of an aperture 7, 8 and the output power of the transceiver 2 is a linear function. It means that the amount of change of a condition of an aperture 7, 8 is directly transferred to the amount of change of output power of the transceiver 2. If e.g. a window moves from a closed position into a half open position the output power of the transceiver will be reduced by half. In another embodiment of the invention the relation between the open-position of an aperture and the output power is a non-linear function. Further it is possible that for each open-position or attenuation condition of an aperture a value for a specific output power is stored in a mapping table in the controller. If there are several sensor data available like for several windows/doors 7, 8 in the car 1, multiple sensor data can be used by the transceiver 2 to derive a decision for adjusting the output power of the transceiver 2.

The description refers to a downlink situation wherein the mobile device inside the car receives information from a mobile communication network. The invention also relates to uplink communication wherein the mobile device inside the car 1 sends data to a mobile communication network. Then the pick-up antenna 3 works as a serving antenna 3 and the serving antenna 4 inside the car 1 works as a pick-up antenna 4. In uplink situation the controller 21 is adapted to adjust the output power of a radio signal over the antenna 3 which now acts as a serving antenna 3.

The invention claimed is:

1. A method of controlling the output power of a radio transmitting entity of a mobile communication network within a cage having at least one aperture, wherein the radio transmitting entity comprises an antenna, a processor, and a memory, said method comprising:
receiving, by the processor, information associated with a condition of the at least one aperture of the cage from a sensor wherein the information associated with the condition of the at least one aperture comprises information indicating a position of the at least one aperture, the position being in a range between a first location where the at least one aperture is at a fully opened opening of the at least one aperture and a second location where the at least one aperture is fully closed; and
controlling, by the processor, an output power of a radio signal transmitted by the antenna of the radio transmitting entity responsive to the information associated with the condition of the at least one aperture of the cage,
wherein the controlling the output power comprises adjusting the output power as a defined function of the position of the at least one aperture between the first location and the second location.

2. The method according to claim 1, wherein the information associated with the condition of the at least one aperture comprises information indicating an open-position of the at least one aperture.

3. The method according to claim 1, wherein the processor controls the output power responsive to a position sensed by the sensor of a moveable window or a door wherein the output power is increased responsive to the position being sensed indicates a movement toward the second location and is decreased responsive to the position being sensed indicates a movement toward the first location.

4. The method according to claim 1, wherein the cage comprises a cabin of a vehicle or a room in a building.

5. The method according to claim 1, wherein the controlling the output power comprises adjusting the output power of the radio transmitting entity as a linear function of the condition of the at least one aperture.

6. The method according to claim 5, wherein the adjusting the output power comprises adjusting the output power of the radio transmitting entity as a linear function of an amount that the aperture of the cage is open.

7. The method according to claim 1, wherein the controlling the output power comprises adjusting the output power of the radio transmitting entity as a non-linear function of the condition of the at least one aperture.

8. The method according to claim 1, wherein the controlling the output power comprises adjusting the output power of the radio transmitting entity in accordance with a mapping table which maps conditions of the aperture to a value of the output power.

9. The method according to claim 1, wherein the radio transmitting entity comprises a relay node or a repeater.

10. A radio transmitting entity of a mobile communication network, the radio transmitting entity comprising:
an antenna, adapted to transmit a radio signal;
a processor; and
a memory coupled to the processor and comprising computer readable program code that when executed by the processor causes the processor to perform operations comprising:
receiving condition information of at least one aperture from at least one sensor, wherein the condition information associated with the condition of the at least one aperture comprises information indicating a position of the at least one aperture, the position being in a range between a first location where the at least one aperture is at a fully opened opening of the at least one aperture and a second location where the at least one aperture is fully closed; and
controlling the output power of a radio signal transmitted by the antenna responsive to the condition information of the at least one aperture from the at least one sensor that is received, wherein controlling the output power comprises adjusting the output power as a defined function of the position of the at least one aperture between the first location and the second location.

11. The radio transmitting entity of claim 10, wherein the radio transmitting entity communicates with components comprising:
a pick-up antenna of a vehicle for receiving the radio signal; and
at least one sensor in the vehicle which is adapted to monitor the condition information of the at least one aperture,
wherein the antenna transmits the radio signal received by the pick-up antenna.

12. The radio transmitting entity according to claim 10, wherein the controlling the output power for the antenna is further based on whether the at least one aperture is at an open-position.

13. A radio transmitting entity comprising an antenna, adapted to transmit a radio signal, a processor, and a memory coupled to the processor and comprising computer readable program code that when executed by the processor causes the processor to perform operations comprising:
receiving a position of a window and/or door of a vehicle from at least one sensor, the position of the window and/or door of the vehicle being in a range between a first location where the window and/or door of the vehicle is at a fully opened opening of the window and/or door and a second location where the window and/or door of the vehicle is fully closed; and controlling, responsive to the received position of the window and/or door of the vehicle, the output power of the radio signal transmitted by the antenna by adjusting the output power as a defined function of the position of the window and/or door of the vehicle between the first location and the second location.

14. The radio transmitting entity according to claim 13, wherein to control the output power, the processor performs the operations of adjusting the output power of the radio transmitting entity as a linear function of the position of the window and/or door of the vehicle.

15. The radio transmitting entity according to claim 13, wherein to control the output power, the processor performs the operations of adjusting the output power of the radio transmitting entity as a non-linear function of the position of the window and/or door of the vehicle such that the output power of the radio transmitting entity is increased as the position of the window and/or door of the vehicle indicates the window and/or door of the vehicle is moving towards the second location and is decreased as the position of the window and/or door of the vehicle indicates the window and/or door of the vehicle is moving towards the first location.

16. The radio transmitting entity according to claim 13, wherein to control the output power, the processor performs the operations of adjusting the output power of the radio transmitting entity in accordance with a mapping table which maps conditions of the window and/or door of the vehicle to a value of the output power.

17. The radio transmitting entity according to claim 13, wherein the radio transmitting entity communicates with components comprising:

at least one sensor mounted in the vehicle, the at least one sensor adapted to detect the position of the window and/or door of the vehicle; and a pick-up antenna mounted in the vehicle for receiving the radio signal, wherein the antenna transmits the radio signal received by the pick-up antenna.

* * * * *